United States Patent [19]

Kawabe et al.

[11] Patent Number: 4,991,647
[45] Date of Patent: Feb. 12, 1991

[54] HEAT EXCHANGER

[75] Inventors: Tsuyoshi Kawabe, Utsunomiyashi; Tadayoshi Hayashi, Fujimishi; Ryotatsu Otsuka, Osakashi; Ichiro Iwai, Oyamashi; Ichizo Tsukuda, Kishiwadashi; Makoto Tanio, Sakaishi, all of Japan

[73] Assignee: Honda Giken Kogyo Kabushiki Kaisha, Tokyo, Japan

[21] Appl. No.: 539,983

[22] Filed: Jun. 18, 1990

[30] Foreign Application Priority Data

Jun. 19, 1989 [JP] Japan .................................. 1-156362

[51] Int. Cl.⁵ .............................................. F28F 19/00
[52] U.S. Cl. .................................. 165/134.1; 165/180; 165/905
[58] Field of Search ..................... 165/134.1, 180, 905

[56] References Cited

U.S. PATENT DOCUMENTS

| 2,061,921 | 11/1936 | Roath | 138/47 |
| 3,878,871 | 4/1975 | Anthony et al. | 138/140 |
| 3,960,208 | 6/1976 | Anthony et al. | 165/1 |
| 4,203,490 | 5/1980 | Terai et al. | 165/134.1 |
| 4,209,059 | 6/1980 | Anthony et al. | 165/1 |
| 4,317,484 | 3/1982 | Tanabe et al. | 165/134.1 |
| 4,410,036 | 10/1983 | Kanada et al. | 165/134.1 |
| 4,412,869 | 11/1983 | Vernam et al. | 148/2 |
| 4,463,061 | 7/1984 | Otoguro et al. | 428/683 |
| 4,560,625 | 12/1985 | Kaifu et al. | 428/654 |

FOREIGN PATENT DOCUMENTS

| 53-23548 | 7/1978 | Japan | 165/180 |
| 1416134 | 12/1975 | United Kingdom | 165/180 |

Primary Examiner—Stephen M. Hepperle
Assistant Examiner—Allen J. Flanigan
Attorney, Agent, or Firm—Tilton, Fallon, Lungmus & Chestnut

[57] ABSTRACT

A heat exchanger comprises tubular elements and fin members. The tubular elements are made of an aluminum alloy containing 0.05 to 1.0 wt % of Mg, 0.2 to 1.2 wt % of Si, 0.2 to 1.5 wt % of Mn, 0.01 to 0.5 wt % of Fe, as necessary components, and further containing at least one of 0.05 to 0.3 wt % of Cr and 0.01 to 0.05 wt % of Ti, as optional auxiliary components, and 0.05 or less wt % of Cu as a controlled impurity, the balance being aluminum and unavoidable impurities. The fin members are made of another aluminum alloy containing 0.05 to 1.0 wt % of Mg, 0.2 to 1.2 wt % of Si, 0.2 to 1.5 wt % of Mn, 0.01 to 0.5 wt % of Fe, and further containing at least one of 0.01 to 0.1 wt % of In and 0.1 to 2.0 wt % of Zn as necessary components, and still further containing at least one or of 0.05 to 0.3 wt % of Cr and 0.01 to 0.05 wt % of Ti as optional auxiliary components, and 0.05 wt % or less of Cu as a controlled impurity, the balance being aluminum and unavoidable impurities.

8 Claims, 2 Drawing Sheets

HEAT EXCHANGER

BACKGROUND OF THE INVENTION

1. Field of the Invention

The present invention relates to a heat exchanger for use as a radiator, a car heater, an intercooler or the like in automobiles or for other various uses.

2. Description of the Prior Art

In general heat exchangers for the uses mentioned above comprise tube elements which allow a heat exchanging medium to flow therethrough. The alloy "A3003" which is comparatively highly corrosion-resistant has been widely used to manufacture the tube elements in a case wherein water or any other corrosive heat-exchanging medium is employed as in radiators or the like. The known heat exchangers also comprise fin members which are secured to the tubular elements so as to raise the efficiency of heat exchange have been made of the same alloy "A3003".

There has been a problem that in the heat exchangers made of the alloy "A3003" the mechanical strength is often lowered for instance to about 4 Kgf/mm$^2$ as a value of 00.2 (tolerable load), after the tubular elements and the fin members are soldered to each other. Thus, walls constituting the tubular elements and the fin members are usually made thicker to assure sufficient strength. This has led to a larger size, an excessive weight and a higher manufacture cost of the known heat exchangers. In addition, the sacrificial corrosion of the fin members made of the alloy "A3003" has been insufficient to protect the tubular element, thereby rendering the heat exchangers less resistant to corrosion.

OBJECTS AND SUMMARY OF THE INVENTION

Therefore, an object of the invention is provide a heat exchanger which can be as easily manufactured as the known heat exchangers made of the alloy "A3003" are and has an improved mechanical strength after the soldering of its parts.

Another object of the invention is to provide a heat exchanger of improved corrosion resistance.

A still another object of the invention is to provide a heat exchanger smaller in size, lighter in weight and lower in manufacturing cost.

The objects are achieved herein by providing a heat exchanger which comprises tubular elements and fin members: the tubular elements being made of a first aluminum alloy containing 0.05 to 1.0 wt % of Mg, 0.2 to 1.2 wt % of Si, 0.2 to 1.5 wt % of Mn, 0.01 to 0.5 wt % of Fe, as necessary components, and further containing at least one of 0.05 to 0.3 wt % of Cr and 0.01 to 0.05 wt % of Ti, as optional auxiliary components, and 0.05 wt % or less of Cu as a controlled impurity, the balance being aluminum and unavoidable impurities; and the fin members being made of a second aluminum alloy containing 0.05 to 1.0 wt % of Mg, 0.2 to 1.2 wt % of Si, 0.2 to 1.5 wt % of Mn, 0.01 to 0.5 wt % of Fe, and further containing at least one of 0.01 to 0.1 wt % of In and 0.1 to 2.0 wt % of Zn as necessary components, and still further containing at least one of 0.05 to 0.3 wt % of Cr and 0.01 to 0.05 wt % of Ti as optional auxiliary components, and 0.05 wt % or less of Cu as a controlled impurity, the balance being aluminum and unavoidable impurities.

BRIEF DESCRIPTION OF THE DRAWINGS

The other objects, features and advantages of the invention will become apparent from the following description which is made referring to the accompanying drawings: in which.

DETAILED DESCRIPTION OF THE PREFERRED EMBODIMENTS

Figure 1:
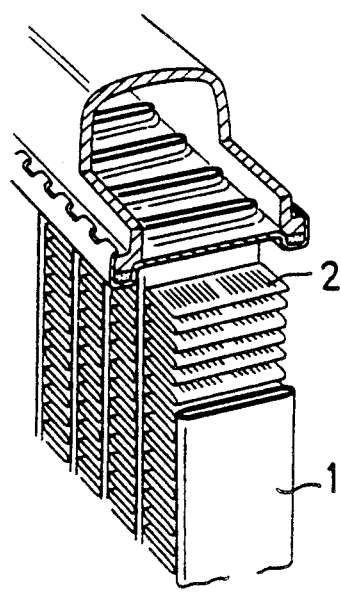
FIG. 1 is a partially broken-off perspective view showing a heat exchanger in an embodiment of the invention.

Aluminum alloys are used to manufacture tubular elements and fin members soldered thereto in the invention so that metallic or other elements contained in said aluminum alloys are explained at first as to their functions, limited contents and the reasons why the contents are so limited. Magnesium (Mg) is effective to improve mechanical strength of the tubular elements and of the fin members soldered-thereto. A content of Mg below 0.05 wt % is not sufficient to obtain such an effect whereas a content above 1.0 wt % causes the soldering to become imperfect. Thus, the most preferable range of Mg content is from about 0.2 to about 0.5 wt %.

Silicon (Si) is useful also to improve the mechanical strength of the tubular elements and of the fin members soldered thereto. A content of Si below 0.2 wt % is not sufficient to obtain such an effect whereas a content above 1.2 wt % causes the soldering to become imperfect. Thus, the most preferable range of Si content is more than 0.6 wt % and up to 0.9 wt %.

Manganese (Mn) improves the corrosion resistance of the tubular elements and strengthen the fin members and the tubular elements. A content of Mn below 0.2 wt % is not sufficient to obtain such an effect whereas this effect is saturated with a content of or less than about 1.5 wt % so that a content above 1.5 wt % gives no merit which can compensate the greater cost. Further, such a high content gives rise to coarse crystals that will lower the workability of the material. Therefore, Mn content must fall most preferably within a range from about 0.5 to about 1.2 wt %.

Iron (Fe) contributes to finer crystals, to higher strength and suppresses intercrystalline corrosion. A Fe content below 0.01 wt % provides no such effect and a Fe content above 0.5 wt % results in saturation of the effect. The most preferable range of Fe content is from about 0.02 to 0.2 wt %.

Indium (In) and zinc (Zn) contained in the material of the fin members impart thereto sacrificial anodic effect relative to the tubular elements. In and Zn are equivalent to each other from a view point of such an effect, and addition of only one of them is sufficient for that purpose. Contents lower than 0.01 wt % of In and lower than 0.1 wt % of Zn is not sufficient to obtain the effect, while contents above 0.1 wt % of In and above 2.0 wt % of Zn promote the self-corrosion of said material and at the same time make it less workable and less solderable. The most preferable ranges of In content and Zn content are from about 0.02 to about 0.08 wt % and from 0.3 to 1.5 wt %, respectively.

In addition to the necessary components, the materials of the tubular elements and the fin members may further contain as the optional auxiliary components one or more of chromium (Cr) and titanium (Ti), Cr being for suppressing the intercrystalline corrosion. A content below 0.05 wt % of Cr is however not sufficient to obtain such an effect, with a higher Cr content above 0.3 wt % resulting in saturation of the effect on the other hand. The most preferable range for Cr content is from about 0.06 to 0.2 wt %. Ti contributes to produce finer crystals wherein a content thereof below 0.01 wt % is insufficient and a higher content above 0.05 wt % does not increase the effect. The most preferable range of Ti content is from about 0.02 to 0.04 wt %.

Among unavoidable impurities contained in the materials of said tubular elements and fin members, copper (Cu) lowers the corrosion resistance of said materials so that its content should be made less than 0.05 wt %.

Figure 2:
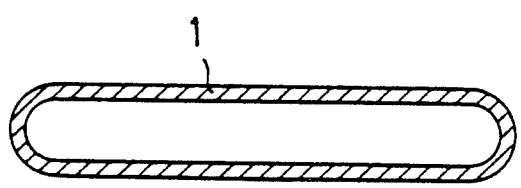
FIG. 2 is a cross section of a tubular element of the heat exchanger in the embodiment.
Figure 3:
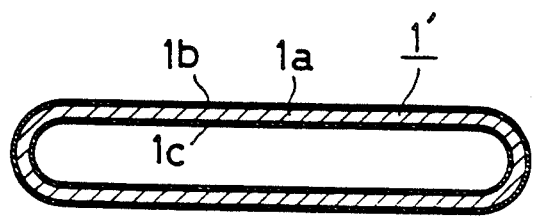
FIG. 3 is a cross section of a modified tubular element also included in the heat exchanger.
Figure 4:
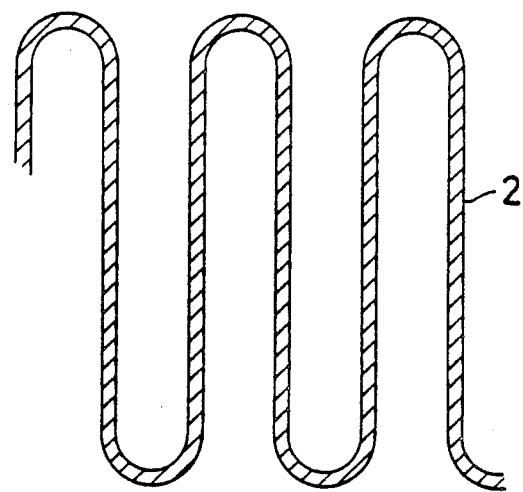
FIG. 4 is a cross section of a fin member in the heat exchanger.
Figure 5:
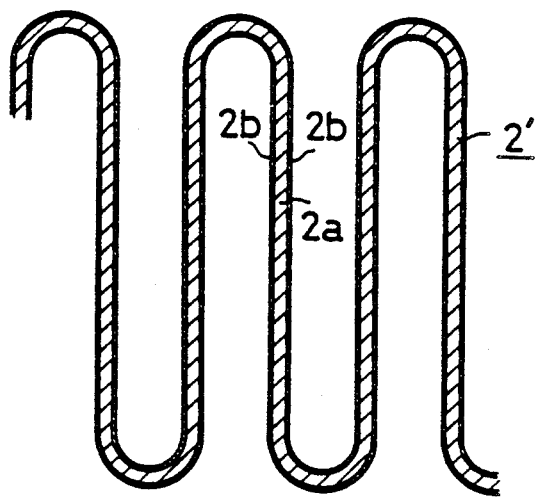
FIG. 5 is a cross section of a modified fin member.

The heat exchanger in an embodiment of the invention is manufactured by soldering the tubular elements 1 to the fin members 2, as shown in FIG. 1. These elements and members may be formed utilizing any appropriate method. For example, the tubular elements may be produced either by simply extruding the material into a tubular shape according to the conventional extrusion technique or by after-drawing the thus prepared intermediate products. Alternatively, the tubular elements may be manufactured by the upset-welding of the sheets which are prepared by the conventional rolling technique. Although each tubular element 1 may be made only of the material which is the first aluminum alloy as shown in FIG. 2, it is also possible to use the alloy as a core part 1a of a tubular element 1' in FIG. 3 which has an outer surface covered with a readily solderable layer 1b. The layer is made of for example an aluminum-silicon alloy which is applied to said outer surface by the cladding method or the like. Further, an inner surface of the tubular element 1' may be covered, as shown in FIG. 3, with a sacrificial anodic layer 1c which is a layer of the alloy "A7072" or the like imparting a higher corrosion resistance to such tubular elements that are incorporated in the heat exchanger through which water or other highly corrosive medium is circulated as in the radiators. On the other hand, the fin members 2 may be manufactured either by using the abovementioned material only as shown in FIG. 4 or by using same as a core part 2a with its one or both surfaces covered by the aluminum-silicon alloy. The alloy is applied to the surfaces according to the cladding or other known technique to thereby forming a readily solderable layer 2b so as to form fin members 2' shown in FIG. 5. Said tubular elements and fin members may be subjected to the so-called natural aging process which further improves their strength or tenacity.

It is to be noted that, as will become apparent from the Examples described below, the tubular elements and the fin members which are employed in the heat exchanger in the invention are easily worked in manufacturing operations to the same or higher degree as or than the known tubular elements and fin members which are made of the alloy "A3003". Besides, the tubular elements and fin members in the invention are of a higher strength after they are soldered to each other. Furthermore, the good corrosion resistance of the tubular elements themselves is still more improved by virtue of the sacrificial anti-corrosion effect of the fin members whereby an excellent durability is given to the heat exchanger. In more detail, the tubular elements and fin members can be made thinner as to their wall thickness, thus decreasing their weights and at the same time lowering their manufacture costs, but within limits not prejudicial to their good durability.

EXAMPLE

Examples of the materials for the tubular elements and for the fin members will now be described.

The aluminum alloys which are listed on Tables 1 and 2 for the tubular elements and for the fin members, respectively, were melted, cast into the desired shapes and then subjected to the homogenizing treatment. The thus prepared alloys were hot-rolled at 500 degrees centigrade, and subjected to the intermediate annealing process for 2 hours at 370 degrees centigrade before finally heat-treated at 600 degrees for 5 minutes. Test pieces of 1.0 mm in thickness were made in this way for the tubular elements and for the fin members. The alloys other than No. 12 for the tubular element in Table 1 and No. 32 for the fin member of Table 2, which latter alloys were of less workability due to Al-Fe-Mn intermetallic compounds of a diameter greater than 100 μm, proved excellent in their workability in mechanical or other processings.

TABLE 1

| | (Materials for tubular elements) | | | | | | | | |
|---|---|---|---|---|---|---|---|---|---|
| Used | Composition (weight %) | | | | | | | | |
| Alloys | Mg | Si | Mn | Fe | Cr | Ti | Cu | Zn | Al |
| Invention | | | | | | | | | |
| 1 | 0.77 | 0.36 | 0.98 | 0.27 | — | — | — | — | Bal. |
| 2 | 0.45 | 0.62 | 0.70 | 0.05 | — | — | — | — | Bal. |
| 3 | 0.56 | 0.58 | 1.12 | 0.08 | — | — | — | — | Bal. |
| 4 | 0.38 | 0.75 | 1.00 | 0.10 | — | — | — | — | Bal. |
| 5 | 0.18 | 0.85 | 0.45 | 0.02 | — | 0.01 | — | — | Bal. |
| 6 | 0.43 | 0.67 | 0.55 | 0.15 | — | 0.02 | — | — | Bal. |
| 7 | 0.42 | 0.44 | 1.40 | 0.08 | 0.20 | — | — | — | Bal. |
| 8 | 0.46 | 0.70 | 0.60 | 0.16 | 0.11 | 0.03 | — | — | Bal. |
| Reference | | | | | | | | | |
| 9 | 1.10 | 0.69 | 0.62 | 0.07 | — | 0.02 | — | — | Bal. |
| 10 | 0.37 | 1.30 | 0.84 | 0.35 | — | — | — | — | Bal. |
| 11 | 0.46 | 0.66 | 0.15 | 0.06 | — | 0.01 | 0.09 | — | Bal. |
| 12 | 0.42 | 0.68 | 1.58 | 0.07 | — | 0.02 | — | — | Bal. |
| 13 | 0.04 | 0.10 | 0.98 | 0.14 | — | 0.03 | — | — | Bal. |
| 14 | — | 0.21 | 1.11 | 0.53 | — | 0.02 | 0.12 | — | Bal. |
| 15 | — | 0.18 | — | 0.16 | — | — | — | 1.03 | Bal. |

Remarks: Reference Nos. 14 and 15 are respectively the alloys "A3003" and "A7072", and "Bal." denotes "balance".

TABLE 2

| | (Materials for fin members) | | | | | | | | |
|---|---|---|---|---|---|---|---|---|---|
| Used | Composition (weight %) | | | | | | | | |
| Alloys | Mg | Si | Mn | Fe | Cr | Ti | Cu | In | Zn | Al |
| Inv. 21 | 0.77 | 0.36 | 0.98 | 0.27 | — | — | — | 0.02 | — | Bal. |
| 22 | 0.45 | 0.62 | 0.70 | 0.05 | — | — | — | 0.05 | — | Bal. |
| 23 | 0.56 | 0.58 | 1.12 | 0.08 | — | — | — | — | 0.40 | Bal. |

TABLE 2-continued

| Used Alloys | (Materials for fin members) Composition (weight %) | | | | | | | | | |
|---|---|---|---|---|---|---|---|---|---|---|
| | Mg | Si | Mn | Fe | Cr | Ti | Cu | In | Zn | Al |
| 24 | 0.38 | 0.75 | 1.00 | 0.10 | — | — | — | 0.08 | — | Bal. |
| 25 | 0.18 | 0.85 | 0.45 | 0.02 | — | 0.01 | — | — | 1.30 | Bal. |
| 26 | 0.43 | 0.67 | 0.55 | 0.15 | — | 0.02 | — | 0.03 | — | Bal. |
| 27 | 0.42 | 0.44 | 1.40 | 0.08 | 0.20 | — | — | 0.06 | 0.70 | Bal. |
| 28 | 0.46 | 0.70 | 0.60 | 0.16 | 0.11 | 0.03 | — | 0.07 | 1.00 | Bal. |
| Ref. 29 | 1.10 | 0.69 | 0.62 | 0.07 | — | 0.02 | — | 0.02 | — | Bal. |
| 30 | 0.37 | 1.30 | 0.84 | 0.35 | — | — | — | — | 0.50 | Bal. |
| 31 | 0.46 | 0.66 | 0.30 | 0.06 | — | 0.01 | 0.09 | — | — | Bal. |
| 32 | 0.42 | 0.68 | 1.58 | 0.07 | — | 0.02 | — | 0.05 | 0.30 | Bal. |
| 33 | 0.04 | 0.10 | 0.98 | 0.14 | — | 0.03 | — | — | — | Bal. |
| 34 | — | 0.21 | 1.11 | 0.53 | — | 0.02 | 0.12 | — | — | Bal. |
| 35 | — | 0.18 | — | 0.16 | — | — | — | — | 1.03 | Bal. |

Remarks: "Inv." and "Ref." respectively denote "Invention" and "Reference". "Bal." denotes "balance", and Reference Nos. 34 and 35 are respectively the alloys "A3003" and "A7072".

The abovementioned test pieces were used to perform the following tests.

Soldering Tests

Figure 6:
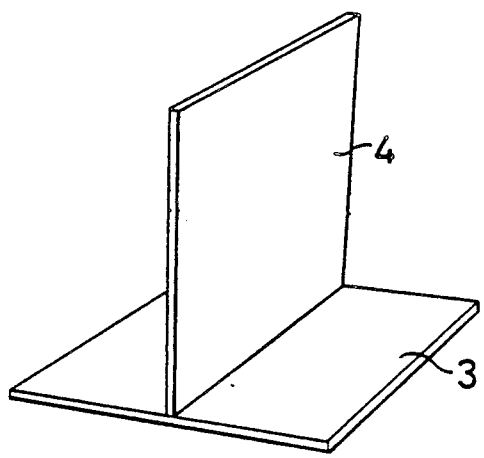
FIG. 6 is a perspective view illustrating a manner in which tested samples are combined in such soldering tests as were carried out on embodiments of the invention.

Each test piece had a dimension of 50 mm in width and 50 mm in length so as to be used in the soldering test wherein the various alloys for the tubular elements and the fin members were combined as shown in Table 3. The soldering was carried out as shown in FIG. 6 in a manner such that the test piece 3 for the tubular element and the other test piece 4 for the fin member were disposed to form a shape of character "T". An amount of Al-Si soldering agent was applied to a region at which said pieces were to be bonded, the soldering by means of a fluoride flux subsequently being performed in a nitrogen gas at 600 degrees centigrade for 5 minutes. The state of the soldered region was visually inspected as to the generation of fillets. The strength of "proof stress" of the soldered test pieces of said tubular element and fin member was also measured to give a result shown in Table 3.

Table 3 indicates that the test pieces for said element and member in the invention are satisfactory in their solderability as well as in their proof stress observed after they have been soldered. Poor solderability was found in the combinations (i.e., sample Nos. 49, 50, 55 and 56) which included the test piece No. 9 or 10 of tubular element or the other test piece No. 29 or 30 of fin member, all of the test pieces comprising an excess amount of Mg or Si. Poor proof stress was found in the combinations (i.e., sample Nos. 51 and 58) which employed the other test piece No. 13 for tubular element or the test piece No. 33 for fin member, both of the test pieces comprising insufficient amounts of Mg and Si. Further, the other combinations (i.e., sample Nos. 52, 54 and 57) comprising the test piece No. 14 for tubular element and/or the test piece No. 34 for fin member proved also to be poor in their proof stress, these test pieces being made of the alloy "A3003".

TABLE 3

| Sample Nos. | Combination | | Solder-ability | Proof Stress after Soldered | | | |
|---|---|---|---|---|---|---|---|
| | | | | Tub. | | Fin | |
| | Tub. (Nos.) | Fin (Nos.) | | σ0.2 (Kgf/mm²) | Rate | σ0.2 (Kgf/mm²) | Rate |
| Inv. 41 | 1 | 23 | Good | 8.0 | Good | 7.9 | Good |
| 42 | 2 | 24 | Good | 7.7 | Good | 8.0 | Good |
| 43 | 3 | 25 | Good | 7.9 | Good | 7.4 | Good |
| 44 | 4 | 27 | Good | 8.0 | Good | 7.5 | Good |
| 45 | 5 | 21 | Good | 7.4 | Good | 8.0 | Good |
| 46 | 6 | 22 | Good | 8.2 | Good | 7.7 | Good |
| 47 | 7 | 28 | Good | 7.5 | Good | 8.6 | Good |
| 48 | 8 | 26 | Good | 8.6 | Good | 8.2 | Good |
| Ref. 49 | 9 | 21 | No (*2) | 14.0 | Good | 8.0 | Good |
| 50 | 10 | 27 | No (*3) | 15.0 | Good | 7.5 | Good |
| 51 | 13 | 25 | Good | 4.0 | No | 7.4 | Good |
| 52 | 14 | 22 | Good | 4.3 | No | 7.7 | Good |
| 53 | 15 | 24 | Good | 2.0 | No | 8.0 | Good |
| 54 | 14 | 34 | Good | 4.3 | No | 4.3 | No |
| 55 | 2 | 29 | No (*2) | 7.7 | Good | 14.0 | Good |
| 56 | 3 | 30 | No (*3) | 7.9 | Good | 15.0 | Good |
| 57 | 6 | 34 | Good | 8.2 | Good | 4.3 | No |
| 58 | 8 | 33 | Good | 8.6 | Good | 4.0 | No |

(Remarks: "Inv." and "Ref." respectively denote "Invention" and "Reference". "Tub." and "Fin" denote "tubular element" and "fin member", respectively. "Good" indicates the proof stress higher than 7 Kgf/mm², "No" indicating the proof stress lower than 5 Kgf/mm². The mark *2 indicates non-uniform generation of fillets, while the mark *3 indicating intercrystalline corrosion taking place near the fillets.)

Sacrificial Corrosion of Fin Members

The test piece of tubular element made of the alloy No. 3 was combined with each of the various test pieces of fin members in a state such that they formed the rigid "T"-shape after soldered to each other. Saltwater was sprayed onto the thus prepared samples for 1,000 hours in accordance with the standard method JIS-Z-2371 in order to inspect the corrosion of the test piece of tubular element. The result of this test is given on Table 4.

As will be seen from Table 4, the test pieces of fin members in the invention are excellent in their sacrificial anodic effect. In contrast with that, the sacrificial anodic effect of the test pieces of fin members is poor for the alloy No. 34, i.e., alloy "A3003", for the alloy No. 31 which is rich in Cu-content but deficient in the metals In and Zn, and for the alloy No. 33 also deficient in the metals In and Zn.

TABLE 4

| Test Pieces of Fin Members | Corrosion in Test Pieces of Tubular Elements |
|---|---|
| Invention | |
| No. 21 | Corrosion pinholes of or less than 0.1 mm |
| No. 22 | " |
| No. 23 | " |
| No. 24 | " |
| No. 25 | " |
| No. 26 | " |
| No. 27 | " |
| No. 28 | " |
| Reference | |
| No. 29 | Corrosion pinholes of or less than 0.1 mm |
| No. 30 | " |
| No. 31 | Corrosion pinholes of 0.3 |
| No. 32 | Corrosion pinholes of or less than 0.1 mm |
| No. 33 | Corrosion pinholes of 0.2 |
| No. 34 | Corrosion pinholes of 0.3 |
| No. 35 | Corrosion pinholes of or less than 0.1 mm |

Corrosion Resistance of Tubular Elements (1) Corrosion Test on Inner Surface

Inner surfaces of the test pieces of tubular elements were subjected to the corrosion test because a highly corrosive heat-exchanging medium such as water is likely to be used in, for instance, the radiators. The test pieces where shaped to be 40 mm in width and 70 mm in length, and corrosion was inspected after immersion thereof in the ASTM "decuple water" plus 10 ppm solution of $Cu^{++}$ at 95 degrees centigrade for 500 hours.

TABLE 5

| Tubular Elements | Corrosion on Inner Surface | Corrosion on Outer Surface |
|---|---|---|
| Invention | | |
| No. 1 | Corr. ≦ 0.1 mm | Corr. ≦ 0.1 mm |
| No. 2 | " | " |
| No. 3 | " | " |
| No. 4 | " | " |
| No. 5 | " | " |
| No. 6 | " | " |
| No. 7 | " | " |
| No. 8 | " | " |
| Reference | | |
| No. 9 | Corr. ≦ 0.1 mm | Corr. ≦ 0.1 mm |
| No. 10 | " | " |
| No. 11 | " | Corr. of 0.3 mm |
| No. 12 | " | Corr. ≦ 0.1 mm |
| No. 13 | " | " |
| No. 14 | " | " |
| No. 15 | Surface corrosion of 0.1 mm, with numerous deposits | Surface corrosion of 0.1 mm, with numerous deposits |

Remarks: "Corr." denotes "corrosion pinholes".

Corrosion Test on Outer Surface

The saltwater-spraying test according to the standard of JIS-Z-2371 was conducted for 1,000 hours for each test piece which was 40 mm in width and 70 mm in length, in order to inspect their surface corrosion.

Results obtained in the corrosion tests on inner surface and on outer surface are given on Table 5.

As seen from Table 5, the test pieces of tubular elements in the invention are highly corrosion resistant whereas the test piece No. 11 which contains insufficient amount of Mn but is rich in Cu is poor in its corrosion resistance.

It will now be apparent in view of the abovementioned various tests that the heat exchanger in the invention is of a high strength and further is highly corrosion resistant even after the soldering of the tubular elements and the fin members.

What is claimed is:

1. A heat exchanger which comprises tubular elements and fin members:
    the tubular elements being made of a first aluminum alloy containing 0.05 to 1.0 wt % of Mg, 0.2 to 1.2 wt % of Si, 0.2 to 1.5 wt % of Mn, 0.01 to 0.5 wt % of Fe, as necessary components, and 0.05 wt % or less of Cu as a controlled impurity, the balance being aluminum and unavoidable impurities; and
    the fin members being made of a second aluminum alloy containing 0.05 to 1.0 wt % of Mg, 0.2 to 1.2 wt % of Si, 0.2 to 1.5 wt % of Mn, 0.01 to 0.5 wt % of Fe, and further containing at least one of 0.01 to 0.1 wt % of In and 0.1 to 2.0 wt % of Zn as necessary components, and 0.05 wt % or less of Cu as a controlled impurity, the balance being aluminum and unavoidable impurities.

2. A heat exchanger as set forth in claim 1 wherein both of the tubular elements and fin members contain 0.2 to 0.5 wt % of Mg; more than 0.6 wt % and up to 0.9 wt % of Si; 0.5 to 1.2 wt % of Mn; and 0.02 to 0.2 wt % of Fe: the fin members containing 0.02 to 0.08 wt % of In; and 0.3 to 1.5 wt % of Zn.

3. A heat exchanger which comprises tubular elements and fin members:
    the tubular elements being made of a first aluminum alloy containing 0.05 to 1.0 wt % of Mg, 0.2 to 1.2 wt % of Si, 0.2 to 1.5 wt % of Mn, 0.01 to 0.5 wt % of Fe, as necessary components, and further containing at least one of 0.05 to 0.3 wt % of Cr and 0.01 to 0.05 wt % of Ti, as auxiliary components, and 0.05 wt % or less of Cu as a controlled impurity, the balance being aluminum and unavoidable impurities; and
    the fin members being made of a second aluminum alloy containing 0.05 to 1.0 wt % of Mg, 0.2 to 1.2 wt % of Si, 0.2 to 1.5 wt % of Mn, 0.01 to 0.5 wt % of Fe, and further containing at least one of 0.01 to 0.1 wt % of In and 0.1 to 2.0 wt % of Zn as necessary components, and 0.05 wt % or less of Cu as a controlled impurity, the balance being aluminum and unavoidable impurities.

4. A heat exchanger as set forth in claim 3 wherein both of the tubular elements and fin members contain 0.2 to 0.5 wt % of Mg; more than 0.6 wt % and up to 0.9 wt % of Si; 0.5 to 1.2 wt % of Mn; and 0.02 to 0.2 wt % of Fe: the tubular elements containing 0.06 to 0.2 wt % of Cr; and 0.02 to 0.04 wt % of Ti: and the fin members containing 0.02 to 0.08 wt % of In; and 0.3 to 1.5 wt % of Zn.

5. A heat exchanger which comprises tubular elements and fin members:
    the tubular elements being made of a first aluminum alloy containing 0.05 to 1.0 wt % of Mg, 0.2 to 1.2 wt % of Si, 0.2 to 1.5 wt % of Mn, 0.01 to 0.5 wt % of Fe, as necessary components, and 0.05 wt % or less of Cu as a controlled impurity, the balance being aluminum and unavoidable impurities; and the fin members being made of a second aluminum alloy containing 0.05 to 1.0 wt % of Mg, 0.2 to 1.2 wt % of Si, 0.2 to 1.5 wt % of Mn, 0.01 to 0.5 wt % of Fe, and further containing at least one of 0.01 to 0.1 wt % of In and 0.1 to 2.0 wt % of Zn as necessary components, and still further containing at least one of 0.05 to 0.3 wt % of Cr and 0.01 to 0.05 wt % of Ti as auxiliary components, and 0.05 wt % or less of Cu as a controlled impurity, the balance being aluminum and unavoidable impurities.

6. A heat exchanger as set forth in claim 5 wherein both of the tubular elements and fin members contain 0.2 to 0.5 wt % of Mg; more than 0.6 wt % and up to 0.9 wt % of Si; 0.5 to 1.2 wt % of Mn; and 0.02 to 0.2 wt % of Fe: the fin members containing 0.02 to 0.08 wt % of In; 0.3 to 1.5 wt % of Zn; 0.06 to 0.2 wt % of Cr; and 0.02 to 0.04 wt % of Ti.

7. A heat exchanger which comprises tubular elements and fin members:

the tubular elements being made of a first aluminum alloy containing 0.05 to 1.0 wt % of Mg, 0.2 to 1.2 wt % of Si, 0.2 to 1.5 wt % of Mn, 0.01 to 0.5 wt % of Fe, as necessary components, and further containing at least one of 0.05 to 0.3 wt % of Cr and 0.01 to 0.05 wt % of Ti, as auxiliary components, and 0.05 wt % or less of Cu as a controlled impurity, the balance being aluminum and unavoidable impurities; and the fin members being made of a second aluminum alloy containing 0.05 to 1.0 wt % of Mg, 0.2 to 1.2 wt % of Si, 0.2 to 1.5 wt % of Mn, 0.01 to 0.5 wt % of Fe, and further containing at least one of 0.01 to 0.1 wt % of In and 0.1 to 2.0 wt % of Zn as necessary components, and still further containing at least one of 0.05 to 0.3 wt % of Cr and 0.01 to 0.05 wt % of Ti as auxiliary components, and 0.05 wt % or less of Cu as a controlled impurity, the balance being aluminum and unavoidable impurities.

8. A heat exchanger as set forth in claim 7 wherein both of the tubular elements and fin members contain 0.2 to 0.5 wt % of Mg; more than 0.6 wt % and up to 0.9 wt % of Si; 0.5 to 1.2 wt % of Mn; 0.02 to 0.2 wt % of Fe; 0.06 to 0.2 wt % of Cr; and 0.02 to 0.04 wt % of Ti: the fin members containing 0.02 to 0.08 wt % of In; and 0.3 to 1.5 wt % of Zn.

* * * * *

UNITED STATES PATENT AND TRADEMARK OFFICE
CERTIFICATE OF CORRECTION

PATENT NO. : 4,991,647

DATED : February 12, 1991

INVENTOR(S) : Tsuyoshi Kawabe, et al

It is certified that error appears in the above-identified patent and that said Letters Patent is hereby corrected as shown below:

On the title page, the assignee should read as follows:

Honda Giken Kogyo Kabushiki
    Kaisha, Tokyo, Japan and
    Showa Aluminum Kabushiki Kaisha, Osaka, Japan Signed and Sealed this Nineteenth Day of April, 1994

*Attest:*

BRUCE LEHMAN

*Attesting Officer*     *Commissioner of Patents and Trademarks*